United States Patent Office 3,075,732
Patented Jan. 29, 1963

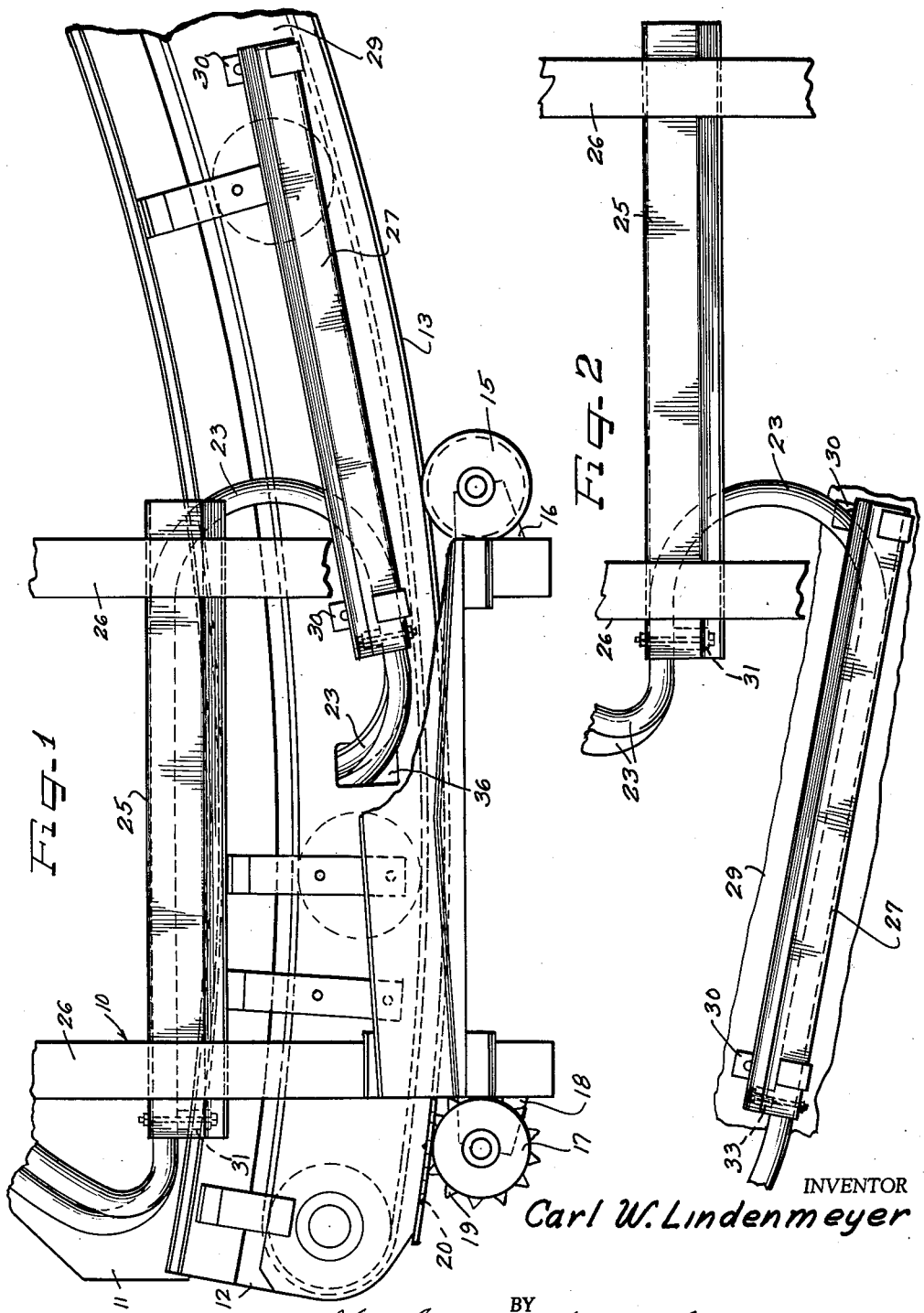

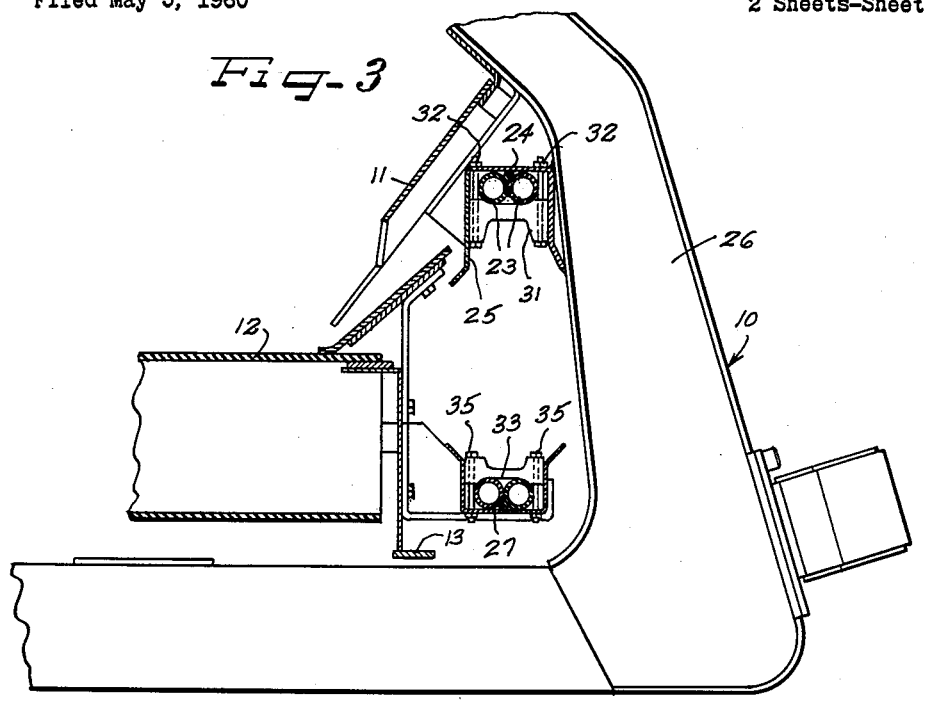
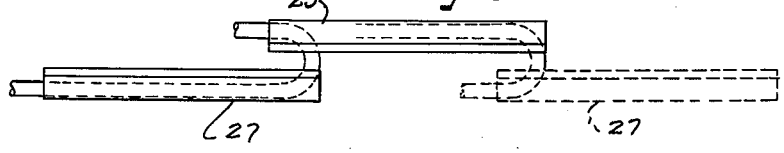
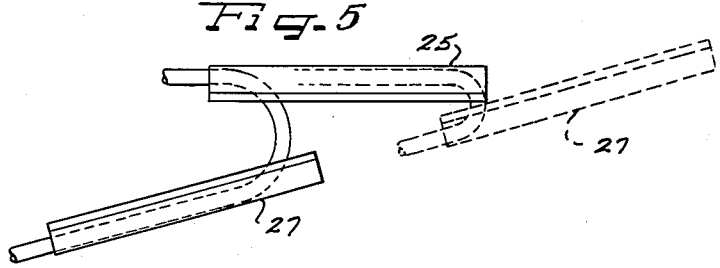
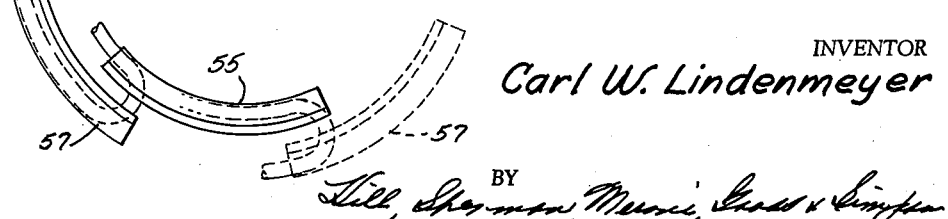
INVENTOR
Carl W. Lindenmeyer
BY
ATTORNEYS

3,075,732
FLEXIBLE HOSE TRAINING DEVICE
Carl W. Lindenmeyer, Aurora, Ill., assignor to Barber-Greene Company, Aurora, Ill., a corporation of Illinois
Filed May 5, 1960, Ser. No. 27,090
2 Claims. (Cl. 248—49)

This invention relates to improvements in training devices for flexible power transmission devices such as hydraulic power transmitting hoses, electrical conductors and the like, for transmitting power between two relatively movable parts.

In transferring hydraulic and electric power from one part to another, where the parts are relatively movable with respect to each other, and particularly where the parts are the parts of a ditching machine or a like machine operable in abrasive and wet material, the hydraulic power transmitting hoses and electrical conductors frequently hang up on a stationary part while the moving part is continuing to move, or the hoses become kinked and rub against the parts of the machine and extraneous parts on the ground. The hydraulic power transmitting hoses and power conducting cables in such machines besides being subjected to tension stresses where hung up are also subjected to excessive bending or kinking and to the abrasive action of the material in which the machine is operating, resulting in materially shortening the life of the hoses and cables and in frequent breaking thereof.

A principal object of the present invention, therefore, is to provide a simple and improved form of training device for the flexible power transmitting members, transmitting power between two parts, one of which is relatively movable with respect to the other arranged with a view towards eliminating hanging up and kinking of the flexible power transmitting members, and reducing the abrasive actions thereon.

A further object of the invention is to provide a training device for training the hydraulic power hoses and flexible power conducting cables from a stationary to movable part, in which the hoses and cables are looped to turn about a controlled arc and are payed off one part of the training device as they are payed onto the other part of the training device during relative movement of the parts with respect to each other.

A still further object of the invention is to provide a training device for the power transmitting hoses and conductors transmitting power from a stationary to a movable part, in which trough-like carriers are provided for the flexible power conductors in facing spaced relation with respect to each other, and move relative to each other and have the flexible power transmitting hoses and conductors clamped thereto to loop the hoses and conductors to turn about a controlled arc and pay off one carrier as they are payed onto the other carrier, during relative movement of the parts with respect to each other.

These and other objects of the invention will appear from time to time as the following specification proceeds and with reference to the accompanying drawings wherein:

FIGURE 1 is a partial fragmentary end view of a ditching machine, showing the training device of the invention, training the flexible hydraulic power transmitting members to a movable transfer conveyor;

FIGURE 2 is a partial fragmentary side elevational view with certain parts removed, and showing the training device in an opposite extreme position of travel from the position shown in FIGURE 1;

FIGURE 3 is a transverse sectional view taken through the ditcher shown in FIGURE 1 in order to show certain details of the training device not shown in FIGURE 1;

FIGURE 4 is a diagrammatic view illustrating the arrangement of the training device, for training the flexible power transmitting members from a stationary to a movable part, where the movable part moves in parallel relation with respect to the stationary part;

FIGURE 5 is a diagrammatic view illustrating the movement of the movable part at an angle with respect to the stationary part; and FIGURE 6 is a diagrammatic view illustrating another modification of the training device in which the movable part moves in an arcuate path, concentric with the stationary part.

In the embodiment of the invention illustrated in FIGURES 1, 2 and 3 of the drawings, I have shown a frame structure 10, which may be the frame structure of an endless bucket type of ditching machine having a stationary hopper part 11 guiding the excavated material discharged from the bucket line (not shown) onto a laterally movable transfer conveyor 12, movable with respect to the hopper part 11 to discharge the excavated material to either side of the bucket line and ditch excavated thereby, in a manner well known to those skilled in the art so not herein shown or described further.

The transfer conveyor 12 is shown in FIGURE 1 as being generally arcuate in side elevation and has laterally spaced arcuate bottom rails 13 supported and guided for movement along laterally spaced flanged rollers 15 rotatably mounted on brackets 16 projecting from one side of the frame structure 10. The bottom rails 13 and transfer conveyor 12 are supported at the opposite side of the frame structure 10 on laterally spaced sprockets 17, rotatably mounted on brackets 18 projecting outwardly from the frame structure 10. The sprockets 17 and sprocket teeth 19 mesh within rows of spaced holes 20 extending through the bottom rails 13 and forming in effect rack teeth, to move the transfer conveyor along the frame structure 10 in position to discharge material to either side thereof, at the selection of the operator of the machine. The sprockets 17 may be power driven in any suitable manner.

The conveyor 12 may be a well known form of belt conveyor driven from an independent motor (not shown). As shown in FIGURE 1, two flexible power conductors in the form of hydraulic hoses 23 are provided to supply power to the motor (not shown) for driving the conveyor 12. A flexible cable 24 is shown in FIGURE 3 as being carried between the hoses 23 to supply electric power for certain control operations which need not herein be shown or described since they form no part of the present invention.

The power conductor or hose training device is shown in FIGURE 1 as comprising a carrier 25 in the form of an elongated downwardly opening trough or tray extending beneath the hopper part 11 and welded or otherwise secured to laterally spaced vertically extending frame members 26 of the frame structure 10, and to the outer side of the hopper part 11. A movable carrier 27 in the form of an elongated upwardly opening trough or tray is shown as facing the carrier 25 and as being in generally vertical alignment therewith. The carrier 27 is mounted on an outer side frame member 29 of the conveyor 12 on spaced brackets 30 extending outwardly of the side frame member 29.

When the conveyor 12 is in a central position with respect to the frame members 26, the carrier 27 will be directly beneath the carrier 25 and in vertical aligned relation with respect to said carrier 25. During movement of the conveyor 12 to either side of the frame structure 10, the bottom carrier 27 will thus move in an arcuate path to either side of the carrier 25, and will pay the hoses 23 and conductor 24 onto the carrier 25 as the carrier 25 moves to the extreme position shown in FIGURE 1, and will pay the hoses 23 and conductor 24 from the carrier 25 onto the carrier 27 as the carrier 27 moves to the extreme position shown in FIGURE 2.

As shown in FIGURE 3, a clamp 31 extends across the end portion of the carrier 25 where the hoses 23 and cable 24 enter said carrier and is clamped into engagement with the hoses 23 and the cable 24, as by nuts and bolts 32, to clamp the hoses in position in said carrier. The hoses 23 and cable 24 then extend along the carrier 25 for the full length thereof, when the carrier 27 and conveyor 12 are in the position shown in FIGURE 1. The hoses 23 and cable 24 are then looped backwardly and downwardly to enter the carrier 27, and are clamped to the carrier 27 at the outlet end of said carrier as by a clamp 33, maintained in clamping engagement with the hoses 23 and conductor 24 as by nuts and bolts 35. From thence the hoses 23 and cable 24 extend through an opening 36 to be connected with certain operative and control parts, for operating and controlling operation of the conveyor 12.

It may be seen from FIGURES 1 and 2 that the carriers 25 and 27 loop the hoses 23 and cable 24 to turn about a controlled arc, and that as the conveyor 12 moves to the left the hoses 23 are payed off the carrier 25 onto the carrier 27, as shown in FIGURE 2, and vice versa when the direction of movement of the conveyor is reversed.

In FIGURE 4, I have shown the two carriers moving in parallel relation with respect to each other, while in FIGURE 5 the movable carrier is inclined with respect to the stationary carrier, resulting in a decrease in the radius of curvature of the hoses when the movable carrier 27 is in the broken line position shown in this figure. By proper spacing of the carriers 25 and 27, however, the radius of curvature of the hoses may always be controlled to avoid kinking of the hose in all positions of relative movement of the carriers with respect to each other.

In FIGURE 6, I have shown arcuate carriers 55 and 57 in which the carriers are arranged concentrically of each other and the movable carrier moves about the stationary carrier in concentric relation with respect thereto.

While the hoses 23 are shown as extending along the respective carriers on which they have been payed in free relation with respect thereto, where the hoses or electrical conductors have insufficient natural stiffness to remain firmly in place in the carriers they may be encased in a helical spring (not shown), or may be held in place by a flat spring extending along the facing sides of the hoses or conductors, although for normal hydraulic power transmission operation, the stiffness of the hoses is sufficient to maintain them in position in the carrier to be payed onto or off the carriers during movement of the conveyor to one side or the other of the frame structure 10.

It may be seen from the foregoing that a simplified form of training device has been provided for the hydraulic hoses and flexible conductors for a machine in which it is desired to transfer power from a stationary to a movable part, in which the hoses and power conductors are maintained in position in all positions of relative movement of the parts with respect to each other, and turn about controlled radii during relative movement of the parts with respect to each other, resulting in a definite training of the hoses and flexible conductors and avoiding kinking thereof, or the hanging up of the hoses on a stationary part of the apparatus or an extraneous part during movement of the movable part with respect to the stationary part, and relieving the hoses and flexible power conductor from the abrasive action of the material in which the machine is operating.

While I have herein shown and described several forms in which my invention may be embodied, it may be understood that various other modifications and variations in the invention may be attained without departing from the spirit and scope of the novel concepts thereof, as defined by the claims appended hereto.

I claim as my invention:

1. A training device for training a flexible power transmitting member between two parts, one of which is movable with respect to the other, means training the flexible power transmitting member to pay off and to pay on with respect to said parts upon relative movement of said parts with respect to each other and to loop the flexible power transmitting member to turn about a vertically extending unsupported loop of a radius controlled by the vertical spacing of said parts and free from said parts during relative movement of said parts with respect to each other, comprising a first elongated trough-like carrier secured to a fixed part and extending in the general direction of movement of the movable part, a clamping member at one end of said first carrier clamping the flexible power transmitting member to extend along said carrier towards the opposite end thereof, a second elongated trough-like carrier vertically spaced with respect to said first carrier, and facing said first carrier, said second carrier being secured to a horizontally movable part and extending in the general direction of movement of the movable part in direct vertical alignment with said first trough-like carrier when the parts are in one extreme position of movement with respect to each other and movable into and out of direct vertical alignment with respect to each other upon relative movement of said parts, and a second clamping member clamping the flexible power transmitting member to said second carrier adjacent the same end of said second carrier said flexible power transmitting member is clamped to said first carrier and cooperating with said first clamping member to retain said flexible power transmitting member to extend along said carriers and form an unsupported vertically extending loop between said carriers to pay on and off said carriers upon relative movement of said parts with respect to each other.

2. A training device for a flexible power transmitting member in accordance with claim 1 wherein one carrier extends horizontally and the other carrier moves in angular relation with respect to said one carrier.

References Cited in the file of this patent

UNITED STATES PATENTS

| 2,201,954 | Flygare | May 21, 1940 |
| 2,864,907 | Waninger | Dec. 16, 1958 |
| 3,001,034 | Aitken | Sept. 19, 1961 |

FOREIGN PATENTS

| 819,862 | Great Britain | Sept. 9, 1959 |